United States Patent Office 3,219,593
Patented Nov. 23, 1965

1

3,219,593
HAFNIUM OXIDE-EUROPIUM OXIDE COMPOUNDS AND COMPOSITIONS FOR REACTOR CONTROL ELEMENTS
Harry P. Kling, Glenarm, and Theodore S. Weissmann, Baltimore, Md., assignors to Martin Marietta Corporation, New York, N.Y., a corporation of Maryland
No Drawing. Filed Sept. 26, 1963, Ser. No. 311,619
6 Claims. (Cl. 252—478)

This invention relates to a new hafnium compound and homogeneous solid compositions containing the same and to their preparation. Mome particularly, the invention relates to the development of compositions which are hydration resistant in the presence of water or water vapor and especially relates to the development of stable forms of europium hafnate and europium oxide-hafnium oxide compositions containing europium hafnate for reactor control elements which possess superior hydration resistance.

Thus, it is a special purpose of the invention to evaluate the effect of hafnium oxide additions to europium oxide for, among other things, the stabilization of europium oxide against reaction with silicon-bearing stainless steel and against corrosion-hydration in high temperature-high pressure water. The stabilization of europium oxide by interaction with titanium oxide has already been demonstrated in report MND-M-2346, a report of the Nuclear Division of the Martin Company of Baltimore, Maryland, distributed by the technical information service of the Atomic Energy Commission, and the stabilized europium titanate compound, $$Eu_2O_3 \cdot 2TiO_2$$

is being used in reactor control elements such as control blades. For instance, europium titanate is being used in so-called PM-1 reactor control blades constituting a dispersion of europium titanate in stainless steel and clad with stainless steel so as to form a Y-shaped blade.

It has been found the use of a poison as hafnium as an addition to europium oxide in place of titanium is desirable as (1) the incorporation of hafnium in place of titanium increases the poison content of the compound, and (2) hafnium is an effective absorber of neutrons above the thermal energies.

The following three compositions after being subjected to a solid state reaction set out below were studied for compound formation, corrosion resistance to high temperature and high pressure water and non-reactivity with silicon-bearing stainless stel powder:

(1) Europium hafnate, i.e., europium oxide-hafnium oxide (1:2 mol ratio). This compound is the isomorph

2 of the compound $Eu_2O_3 \cdot 2TiO_2$ which is less corrosion resistant.
(2) Europium oxide-hafnium oxide (1:1 mol ratio). This combination may also be written as $$Eu_2O_3 \cdot 2HfO_2 + Eu_2O_3$$

i.e., a solid solution of europium hafnate and europium oxide.

The raw materials used in this study were europium oxide of 99% purity, hafnium oxide (reactor grade) of 98% purity, and titanium oxide-reagent grade.

The oxide blends were wet mixed for ½ hour in a mortar grinder, dried, and calcined in a zirconia boat at 1200° C. The calcined cake was hand crushed to —325 mesh size and pressed into compacts at 30 t.s.i. The compacts were sintered in rhodium wound resistance furnace at 1550, 1600, and 1800° C. for two hours. Table 1 shows the composition and densities of the europium oxide-hafnium oxide compositions which were studied.

TABLE 1

Composition and density of $Eu_2O_3$—$HfO_2$ blends

| Composition | Mol Ratio | W/o Eu | W/o Hf | Theoretical Density,[1] g./cc. | Sintered Density—Percent Theoretical Density | |
|---|---|---|---|---|---|---|
| | | | | | 1,550° C. Sinter | 1,600° C. Sinter |
| $Eu_2O_3$—$HfO_2$ | 1:2 | 39.4 | 46.2 | 8.48 | 82.3 | 84.5 |
| $Eu_2O_3$—$HfO_2$ | 1:1 | 54.2 | 31.7 | 8.13 | 87.3 | 91.5 |
| $Eu_2O_3$—$HfO_2$—$TiO_2$ | 1:1:1 | 47.5 | 27.8 | 7.30 | 76.7 | 91.5 |

[1] Calculated by method of mixture.

Cermet mixtures of three fired oxide compounds set out above were made by crushing each oxide pellet to a —200 mesh powder and blending with Type 304 stainless steel powder, hereinafter designated as 304 S.S. The compositions of each blend of stainless steel with the europium compound were adjusted to yield a 30 w/o (weight percent) europium oxide content which is equivalent to the europium oxide content of the PM-1 control blades. The cermets were dry blended by tumbling, pressed into pellets at 30 t.s.i. and sintered in hydrogen at 1250° C. for two hours. Table 2 shows the composition, shrinkage and density of the sintered cermet pellets.

TABLE 2

Sintering of $Eu_2O_3$—$HfO_2$ and 304 S.S. cermets

| Composition | W/o | Theoretical Density, g./cc. | Sintered Density, g./cc. | Volume Change on Sintering—Percent |
|---|---|---|---|---|
| 1 {304 S.S. | 51.5 | 8.14 | 6.14 | —5.50 |
| $Eu_2O_3$—$2HfO_2$ | 48.5 | | | |
| 2 {304 S.S. | 59.3 | 7.97 | 5.97 | —1.77 |
| $Eu_2O_3$—$HfO_2$ | 40.7 | | | |
| 3 {304 S.S. | 56.0 | 7.60 | 5.77 | —4.67 |
| $Eu_2O_3$—$HfO_2$—$TiO_2$ | 44.0 | | | |

NOTE.—Europium compounds sintered in air at 1600° C. Cermet blends were sintered in hydrogen at 1250° C. for two hours.

So far as known, the compounds of europium oxide-hafnium oxide compounds have not been reported in the literature. Table 3 lists the X-ray diffraction data on certain compositions set out above specifically studied and, in addition, the X-ray diffraction data of $$Eu_2O_3 \cdot 2TiO_2$$

TABLE 3

*X-ray diffraction—powder data*

| $Eu_2O_3$—$2TiO_2$ | |
|---|---|
| d | $I/I_0$ |
| 2.947 | 100 |
| 2.336 | 30 |
| 1.802 | 40 |
| 1.536 | 25 |

| $Eu_2O_3$—$2HfO_2$ | |
|---|---|
| d | $I/I_0$ |
| 3.046 | 100 |
| 2.635 | 35 |
| 2.466 | 5 |
| 2.427 | 6 |
| 1.865 | 50 |
| 1.594 | 65 |
| 1.500 | 20 |
| 1.317 | 7 |
| 1.209 | 25 |
| 1.179 | 25 |
| 1.077 | 25 |
| 1.017 | 20 |
| 0.893 | 25 |
| 0.879 | 15 |
| 0.835 | 7 |

| $Eu_2O_3$—$HfO_2$—$TiO_2$ | |
|---|---|
| d | $I/I_0$ |
| 2.966 | 100 |
| 2.569 | 50 |
| 1.812 | 55 |
| 1.609 | 15 |
| 1.548 | 50 |

| $Eu_2O_3$—$HfO_2$ | |
|---|---|
| d | $I/I_0$ |
| 3.066 | 100 |
| 2.6550 | 30 |
| 1.886 | 55 |
| 1.607 | 40 |
| 1.540 | 15 |

The patterns of these compositions after heat treatment did not show the presence of a second phase which can be identified as belonging to any one of the original constituents. The $Eu_2O_3 \cdot 2HfO_2$ pattern is similar to the $Eu_2O_3 \cdot 2TiO_2$ which has previously been shown to have cubic pyrochlore structure and is iso-structural with other reported rare earth titanates.

The $Eu_2O_3 \cdot 2HfO_2$ pattern is very similar to rare earth zirconates of lanthanium, neodymium and yttrium as reported by R. Roth in an article entitled "Pyrochloric-Type Compounds Containing Double Oxides of Trivalent and Tetravalent Ions." Journal of Research of the National Bureau of Standards, Volume 56, No. 1 (1956). The pattern of the 1:1 mol $Eu_2O_3 \cdot HfO_2$ composition is very close to that of the 1:2 mol composition except for a slight shift in all lines, which is probably due to a solid solution of $Eu_2O_3$ in $Eu_2O_3 \cdot 2HfO_2$. This is borne out by the corrosion tests as the 1:1 mol ratio of $Eu_2O_3$ to $HfO_2$ is less resistant than the 1:2 mol ratio due to incomplete stabilization of the excess $Eu_2O_3$.

The $Eu_2O_3 \cdot TiO_2 \cdot HfO_2$ structure appears to leave a cubic pyrochlore structure and is probably a solid solution of $Eu_2O_3 \cdot 2HfO_2$ and $Eu_2O_3 \cdot 2TiO_2$. This composition has shown the highest degree of resistance to hydration of the three compositions studied in depth, and it appears that the europium oxide in this composition has been completely tied up through compound formation.

While an important aspect of the invention contemplates the reaction of one mol of europium oxide with 1 to 2 mols of hafnium oxide, larger proportions of hafnium oxide may be used so as to obtain europium hafnate in solid solution with, or associated with, hafnium oxide, so as to dilute the europium hafnate.

The europium oxide-hafnium oxide compositions listed in Table 1 were tested for resistance to water at 570° F.-1226 p.s.i. The results of autoclave testing of the sintered oxide pellets are listed in Table 4.

TABLE 4

*Corrosion testing of $Eu_2O_3$—$HfO_2$ compositions*

| Compositions | Sintering temperature, °C. | Percent wt. change (168 hrs. in autoclave at 570° F., 1,226 p.s.i. | Observations |
|---|---|---|---|
| $Eu_2O_3$—$2HfO_2$ | 1,500 | −0.18 | Partially crumbled. |
|  | 1,600 | +0.15 | No change in shape. |
|  | 1,800 | −0.09 | Do. |
| $Eu_2O_3$—$HfO_2$ | 1,500 | +0.35 | Completely crumbled. |
|  | 1,600 | +0.53 | Partially crumbled. |
|  | 1,800 | +0.30 | Pellet cracked into 4 pieces. |
| $Eu_2O_3$—$HfO_2$—$TiO_2$ | 1,500 | +0.056 | No change in shape. |
|  | 1,600 | 0.00 | Do. |
|  | 1,800 | −0.041 | Do. |

Of the three compositions tested the $Eu_2O_3 \cdot HfO_2 \cdot TiO_2$ pellets appeared to have the best resistance to corrosion and hydration. The $Eu_2O_3 \cdot 2HfO_2$ pellets when sintered at 1600° C. or 1800° C. maintained their shape after testing. The $Eu_2O_3 \cdot HfO_2$ pellets improved in resistance to the water with higher sintering temperatures. The europium hafnates hereof may be used under conditions other than those set out in the tests.

The stainless steel-europium oxide blend cermets were tested for corrosion resistance to boiling water and to high temperature-high pressure autoclave water. The results of these tests are given in Table 5.

TABLE 5

*Corrosion testing of $Eu_2O_3$—$HfO_2$+$304$ S.S. cermets [1]*

| Composition | W/o | 168 hours—boiling water | | 168 hours—autoclave water at 570° F.—1,226 p.s.i. | |
|---|---|---|---|---|---|
|  |  | Percent wt. change | Percent dia. change | Percent wt. change | Percent dia. change |
| 1 {304 S.S. | 51.5 | −0.027 | 0.00 | +1.00 | +0.21 |
| {$Eu_2O_3$—$2HfO_2$ | 48.5 | | | | |
| 2 {304 S.S. | 59.3 | | 0.00 | −0.015 | 0.00 |
| {$Eu_2O_3$—$HfO_2$ | 40.7 | | | | |
| 3 {304 S.S. | 56.0 | | | | |
| {$Eu_2O_3$—$HfO_2$—$TiO_2$ | 44.0 | −0.043 | 0.00 | +0.41 | 0.00 |

[1] Europium compounds sintered at 1600° C. Cermet blends sintered at 1250° C. for two hours in hydrogen.

The weight and dimensional change after boiling water and autoclave tests for the three cermet compositions are very small and compare most favorably with europium titanate-stainless steel cermets that have been similarly tested.

The reaction of europium oxide with silicon bearing stainless steel during the sintering of the cermet mixture has been reported in an Oak Ridge National Laboratory report No. ONRL-2946 by C. Leitten, Jr., "The Stability of Europium Oxide in Silicon-Bearing Steel" (1946). This reaction is evidenced by a volume increase in the sintered compact and the deposition of a yellow-green film on the compact surfaces. Volume increases of up to six percent were found in sintering of cermets of europium oxide in stainless steel containing high silicon (2 w/o).

As seen in Table 2 a volume decrease took place on sintering for each of the three cermet compositions. The sintered cermets had a bright metallic surface with no evidence of reaction between the constituents in the cermet.

Sample control elements were prepared by the standard picture frame technique with a pellet from each composition listed in Table 2. The sintered cermet cores were coated with a flame sprayed layer of stainless steel on the top and bottom surface before assembling into the picture frame. The assemblies were then welded, evacuated, and hot rolled at 1150° C. The rolling reduction averaged 10% per pass with an overall reduction of 3.5 to 1.

Metallographic examination of the hot rolled specimens showed a high density core with no cracking evident in the core. A good metallurgical bond at the core-clad interface was also noted.

Samples of the rolled elements were prepared for autoclave testing. The test speciments were intentionally defected by drilling a hole through the core and cladding, and, in addition, were cut to expose the complete core on one face. After 168 hours of autoclave testing at 570° F. and 1220 p.s.i. the test specimens showed no measurable dimensional changes. Chemical analysis of the water from each autoclave sample after testing showed less than 1 p.p.m. of europium for each of the three samples.

Thus it will be seen the compound $Eu_2O_3 \cdot 2HfO_2$, europium hafnate, was prepared by high temperature solid state reaction of $Eu_2O_3$ and $HfO_2$. The compound is isostructural with $Eu_2O_3 \cdot 2TiO_2$. A combination of europium titanate and europium hafnate of the composition $Eu_2O_3$—$HfO_2$—$TiO_2$ (1:1:1 mol ratio) was also prepared by the same method, which appears very similar in structure to the europium titanate and europium hafnate and is considered to be a solid solution of the two europium compounds.

The europium oxide-hafnium oxide compositions show good resistance to water corrosion in high temperature-high pressure water autoclave testing. The compositions studied are compatible with silicon bearing stainless steel and show no deleterious effect during the sintering of stainless steel cermets at 1250° C. The cermets also show good resistance to water corrosion testing.

The substitution of europium hafnates for europium titanate in a control rod has led to a more efficient reactor design. The thermal neutron capture cross section of europium hafnate is increased only moderately relative to europium titanate because of the predominent effect of the europium. However, europium hafnate exhibits strong resonance capture peaks in the epithermal range, particularly important in compact reactor systems, making the europium hafnate significantly more effective than the titanate.

It will be apparent the foregoing discussion and specific embodiments of the invention are given solely for illustrative purposes and that the invention contemplates many other embodiments of Eu-Hf homogenous solid compositions in which $Eu_2O_3$ and $HfO_2$ are associated with one another in various molar proportions. In the illustrative specific embodiments of the invention discussed above, at least one mol of $HfO_2$ is present per mol of $Eu_2O_3$ including two mols, or more, of $HfO_2$ per mol of $Eu_2O_3$ so that in the latter instance all of the $Eu_2O_3$ is tied up with $HfO_2$ and especially stable europium homogenous stable solid compositions result. In the latter instance it has been shown one of the mols of $HfO_2$ can be replaced with a mol of $TiO_2$. It will be equally apparent the specific compounds $Eu_2O_3 \cdot 2HfO_2$ can be written $Eu_2Hf_2O^7$.

What is claimed is:
 1. The solid and homogenous compositions

$$(Eu_2O_3)_1 \cdot (HfO_2)_n \cdot (TiO_2)_m$$

where $n$ has a value from 1 to 2, $m$ has a value from 0 to 1; and when $n$ is 1, $m$ is 1.
 2. The solid and homogenous composition $Eu_2O_3 \cdot HfO_2$.
 3. The compound $Eu_2O_3 \cdot 2HfO_2$.
 4. The solid and homogenous composition $$Eu_2O_3 \cdot HfO_2 \cdot TiO_2$$

5. A reactor control element containing $$(Eu_2O_3)_1 \cdot (HfO_2)_n$$

where $n$ is 1–2, as a control device.
 6. A reactor control element containing $$Eu_2O_3 \cdot HfO_2 \cdot TiO_2$$

as a control device.

References Cited by the Examiner
UNITED STATES PATENTS 2,859,163 11/1958 Ploetz _____ 176—93 X
3,031,395 4/1962 Precht et al. _____ 176—93 X CARL D. QUARFORTH, *Primary Examiner.*
REUBEN EPSTEIN, *Examiner.*